United States Patent [19]

Hubka et al.

[11] 4,160,248

[45] Jul. 3, 1979

[54] SOLID STATE PULSED COHERENT DOPPLER RADAR

[75] Inventors: Theodore Hubka, Pleasantville; Robert W. Slater, Bardonia, both of N.Y.

[73] Assignee: The Singer Company, Little Falls, N.J.

[21] Appl. No.: 854,570

[22] Filed: Nov. 25, 1977

[51] Int. Cl.² .............................................. G01S 9/44
[52] U.S. Cl. ......................................................... 343/8
[58] Field of Search ..................... 343/17.2 R, 17.5, 8; 331/55

[56] References Cited

U.S. PATENT DOCUMENTS

| 3,430,236 | 9/1967 | Gamertsfelder | 343/8 |
| 3,460,067 | 8/1969 | Burnsweig, Jr. | 331/55 |
| 3,710,386 | 1/1973 | Darboven et al. | 343/9 |
| 3,866,224 | 2/1975 | Porter et al. | 343/17.2 R |
| 3,886,550 | 5/1975 | Gilleran et al. | 343/17.2 R |

*Primary Examiner*—Nelson Moskowitz
*Assistant Examiner*—Lawrence Goodwin
*Attorney, Agent, or Firm*—Laurence A. Wright; T. W. Kennedy

[57] ABSTRACT

A Doppler radar employing a common antenna for transmitting and receiving. A single sideband modulator (SSBM) is employed in the transmitting circuit to offset the rf reference frequency during transmit time and to discontinue offset during receiver ON time. Through a coupler and isolators an attenuated portion of the rf reference signal is applied to the receiver mixer at gated intervals. The output of the mixer are signals which are free of undesired reflected transmitter signals.

4 Claims, 5 Drawing Figures

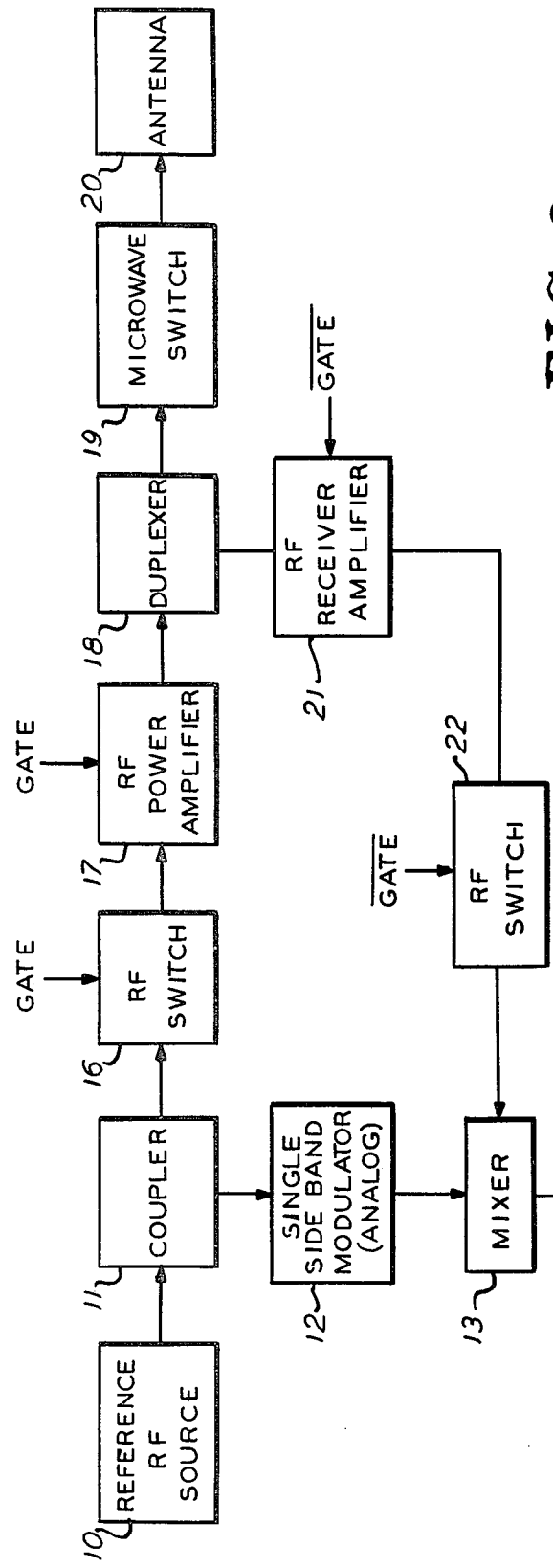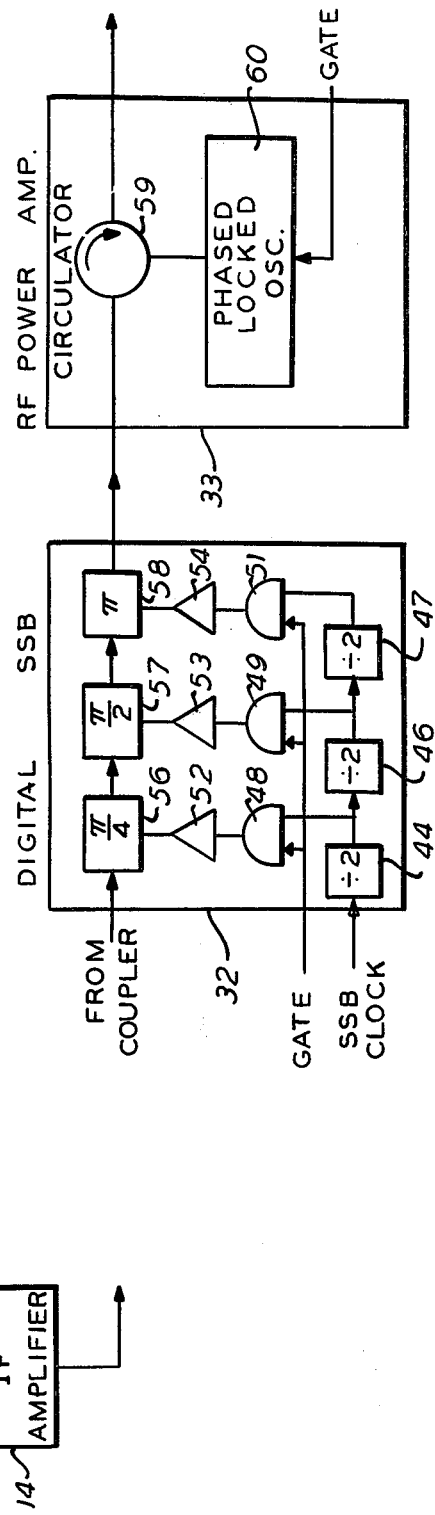

SOLID STATE PULSED COHERENT DOPPLER RADAR

PRIOR ART

U.S. Pat. No. 3,430,236—Sept. 15, 1967—Gamertsfelder

U.S. Pat. No. 3,710,386—Jan. 9, 1973—Darboven et al.

This invention is related to Doppler radar. More particularly, this invention relates to a Doppler radar having means to eliminate spurious Doppler signals.

BACKGROUND OF THE INVENTION

A Doppler radar radiates rf energy of approximately 25 dbm and processes a return echo with a minimum signal strength of approximately −145 dbm in a 100 Hz bandwidth. In order to prevent the transmitter from saturating the receiver, or protect the receiver from modulation products of the transmitter due to vibration, etc. which may cause a spurious Doppler return and invalid velocity outputs, an isolation between the transmitter and receiver of approximately 170 db is required. There are Doppler radars that are currently operational that achieve this by using separate transmit and receive antennas. However, this has the disadvantage that each antenna uses only 50% of the available aperture, and therefore has double the beamwidth of an antenna that uses 100% of the aperture. Since the short term error of the velocity output of a Doppler radar is related to the square of the Doppler beamwidth, a separate transmit-receive antenna has obvious performance disadvantages.

Newer Doppler radars use modulation techniques to permit use of a single antenna for transmitting and receiving. Frequency modulation of the rf reference achieves about 110 db of isolation, but this still necessitates post mixer electronic processing to remove an additional 60 db of transmitter-receiver "leakage." Even in practical solid state pulse-coherent Doppler radar configurations where the transmitter and receiver functions are alternated in time at a 50% duty ratio, leakage to noise ratios of greater than 50 db are observed.

BRIEF DESCRIPTION OF THE INVENTION

The present invention is designed to provide a solid state pulsed-coherent Doppler radar velocity sensor with a common antenna for both transmitting and receiving. In a preferred embodiment, the receiver has virtual insensitivity to near-in reflections from the radome cavity and the exterior radome. The receiver also has no post-mixer electronic processing circuitry to remove residual transmitter-receiver coupling and has insensitivity to harmonics of the pulse repetition frequency that cause spurious Doppler signals and false lockons. To accomplish these objectives, the Doppler radar of the invention employs a source of rf reference signals which are applied through an isolator and coupler circuit to both the transmitter and receiver circuits. In the transmitter circuit the reference signal is offset by a binary counter circuit (SSBM) and applied to a power amplifier and phase locking circuit which phase locks the reference signal for application to the common antenna by way of a duplexer. The SSBM gates on the offset frequency during transmit time and gates off the offset frequency during receiver on time.

In the receiver circuit, a portion of the rf reference signal is attenuated and applied to the receiver mixer. Also applied to the receiver mixer under gating signals are Doppler return signals. The output of the mixer are signals which are free of undesired reflected transmitter signals and which are further processed to provide velocity data.

Accordingly, it is an object of this invention to provide a Doppler radar velocity sensor having means to eliminate from the receiver unwanted spurious reflected transmitter signals.

This and other objects, features and advantages of the present invention will become apparent from the following description taken in conjunction with the accompanying drawings wherein:

FIG. 1 is a block diagram of a first embodiment of a Doppler radar which provides in the receiver means for eliminations of spurious reflected transmitter signals;

FIG. 3 is a more detailed block diagram of the single sideband modulator and phase locking circuit of FIG. 2.

Figure 2:
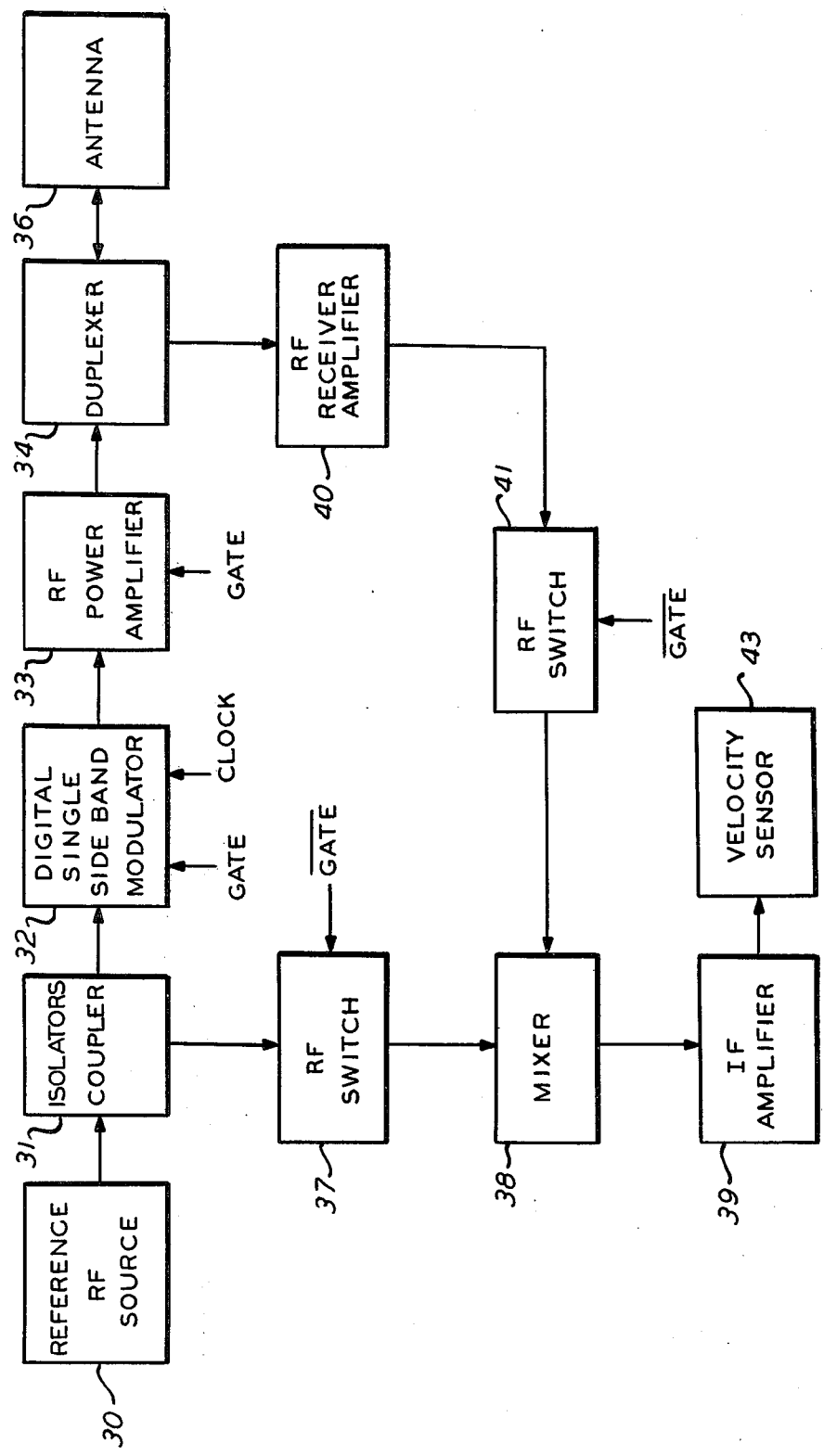
FIG. 2 is a block diagram of the preferred embodiment of the Doppler radar of the invention showing means in the transmitter for the elimination of spurious reflected transmitter signals.

Turning to FIG. 1, there is shown a first embodiment of the invention. In this embodiment, a portion of the signal obtained from the rf reference source 10 is applied by way of coupler 11 to SSBM 12 where the frequency is side-stepped. The circuits 11, 12 and 13 constitute the local oscillator circuits and are used as a coherent oscillator to be mixed with the Doppler return signals traveling the path from antenna 20, microwave switch 19, duplexer 18, rf receiver amplifier 21, rf switch 22 and mixer 13.

The reference rf signal path through the transmitter circuits is from rf signal source 10, coupler 11, rf gate switch 16, rf power amplifier 17, duplexer 18, microwave 19 to antenna 20. In the FIG. 1, embodiment gating signals are applied to circuits 16 and 17 to turn on the transmitter. Gating signals are also applied to circuits 21 and 22 of the receiver to turn off the receiver during transmitter ON time. The microwave signal component from coupler 11 which is used to frequency shift the local oscillator circuits to obtain the IF frequency is an analog single sideband modulator 12. Circuit 12 by its nature, is narrow banded to reject unwanted modulation products. However, this prevents circuit 12 from being gated at a fast rate. Circuit 12 also has insertion losses of of greater than 10 db which requires that it can only be placed in the local oscillator circuits. Additionally, the receiver can tolerate an IF of 5 MHz minimum in order to achieve reasonable image rejections.

The disadvantages of the above technique are that the products from the SSBM intermodulations in the mixer results in greater than 60 db leakage noise. Also, during the receiver ON, CW signals from the rf generator couple into the receiver via reflections from the antenna resulting in a leakage to noise of 70 db. Elimination of this leakage source would require additional rf switches in the transmitter circuit. These leakage to noise signals necessitate circuits after the mixer to remove this component. Approximately fifty components are required for this at a very high manufacturing cost. A third disadvantage of the above system is that extraordinary precautions are required to prevent harmonics of the pulse repetition frequency (PRF) at approximately 350

KHz from resulting in spurious signals at the intermediate frequency of 5.0 MHz (minimum).

Turning to FIG. 2, there is shown an improved embodiment of the invention over the embodiment of FIG. 1. The operation begins by applying reference rf signals from reference rf source 30 to isolator and directional coupler 31. Signals from rf source 30 serve as the coherent radio signal reference for both the receiver and transmitter functions simultaneously. Circuit 31 isolates the receiver from the rf source 30 and couples the rf signals to the single sideband modulator (SSBM) 32 in the transmitter branch. Circuit 32 pulses and simultaneously frequency offsets the reference signal only during transmit time. The output signal from SSBM 32 is applied to rf power amplifier 33 which amplifies and phase locks it. Isolators in circuit 31 serve to decouple reflections from SSBM 32 so as not to impair the frequency stability of reference rf source 30. The output of the rf power amplifier 33 is coupled through duplexer 34 to antenna 36. Antenna 36 is the common antenna for both receiving and transmitting. The purpose of duplexer 34 is to decouple the receiver from the transmitter with minimum loss. The received signal from antenna 36 is amplified by the rf receiver 40 and coupled through rf switch 41 to mixer 38. The function of rf switch 41 is to time duplex the carrier break through which exists because of imperfect action of duplexer 34 and antenna reflection. The received signal is down converted in mixer 38 by demodulating with the reference signal that is derived from rf switch 37. Rf switch 37, which is gated in time sequence with rf switch 41, serves to attenuate the local oscillator into the mixer during transmitter ON time, thereby preventing any frequency translation of transmitted signals which leaks into the mixer. After demodulation, the received signal is amplified in IF amplifier 39. The output of amplifier 39 is applied to velocity determination circuits 43.

The configuration of the invention is such that it may be constructed as a practical solid state pulsed-coherent radar. For example, rf power amplifier and phase lock oscillator 33 may be a pulsed IMPATT or Transferred Electron Oscillator or Amplifier. Duplexer 34 may be a tunnel diode or a field effect transistor amplifier. None of these devices offer by themselves sufficient isolation during their pulse OFF states necessitating additional gating in the single sideband modulator and receiver switches. With these switches, the necessary gating is achieved in this invention configuration with practical devices. The SSB modulator and receiver switching frequencies are conveniently set to be above the IF amplifier passband (block 39).

FIG. 3 illustrates key elements of the SSB modulator 32 and rf amplifier and phase locked oscillator 33. For simplicity, the bias circuits of the SSB modulator and rf amplifier are omitted. The SSB modulator 32 consists of binary counters 44, 46, 47, gates 48, 49, 51 amplifiers 52, 53, 54 and digital phase shifters 56, 57 and 58. The phase shifters are employed to step the rf phase in a step linear periodic fashion. This gives a good approximation of a frequency shift during the pulse "ON" command. The offset frequency is not present at the output during pulse "OFF" period (i.e. Receiver ON). After the frequency offset, the rf power amplifier 33 is phase locked to this signal. This device hard limits the rf input thereby removing the amplitude modulated sidebands generated by the digital phase shifters. The hard limiting results in the amplitude of the input signal being limited to a fixed amplitude range, so that the amplifier output is now independent of amplitude changes on the input.

Figure 4A:
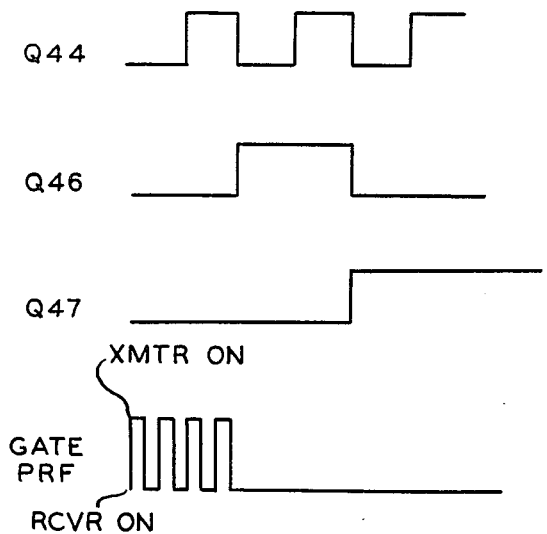
FIGS. 4A and 4B show the waveforms of the phase shifters.

The waveforms of the outputs from the countdown circuits (44,46,47) in the digital SSB 32 of FIG. 3 are shown in FIG. 4A. Also shown is the gate signal which alternates the transmitting and receiving function at a 50 percent duty ratio.

Figure 4B:

The input from the coupler 31 is a continuous wave signal (cos $\omega_c t$) where $\omega_c$ is the frequency. When the PRF gate is high, one or more of the three rf phase shifters (56,57,58) are turned on. It is observed from FIG. 4B, that as time progresses the rf phase shifters increase by 45° during each half-period. It can be shown that this is a "staircase" approximation to a constant phase shift with time of $\kappa \cdot t$ where $\kappa$ is a constant and $t$ is time. The CW rf signal output is then:

$$\cos(\omega_c t + \phi) = \cos(\omega_c t + \kappa \cdot t) = \cos(\omega_c + \kappa) \cdot t$$

If the half periods are selected that 360° phase shift occurs within $1/f_{IF}$, then the rf transmitter output is:

$$\cos(\omega_c + \omega_{IF}) \cdot t$$

When the receiver is on, the gate commands all the rf phase shifters to the zero rf state, resulting in an output of:

$$\cos(\omega_c t + 0°) \text{ or } \cos(\omega_c t)$$

The function of the Digital SSB 32 is to frequency translate the rf input by the microwave configuration offset frequency, $\omega_{IF}$. The principle of operation is to switch in three rf phase shifters 56, 57 and 58 at a rate which approximates a linear phase shift. The reason that a linear phase shift results in a frequency translation can be shown as follows:

If the input to the frequency translator is $\cos \omega_c \cdot t$, and the translator varies the phase of the input at a constant rate, or $\omega_{IF} \cdot t$ where $\omega_{IF}$ is a constant, and $t$ is time, then the output is $\cos(\omega_c \cdot t + \phi)$ or $\cos(\omega_c \cdot t + \omega_{IF} t) = \cos(\omega + \omega_{IF}) \cdot t$. Hence, the translator has frequency shifted the input by $\omega_{IF}$.

The digital SSB utilizes three rf phase shifters which can be independently switched to the following states 0° or 45°, 0° or 90°, 0° or 180°. The principle of operation is to progressively increase the rf phase in steps of 45° at a rate resulting in 360° of phase shift in a time period of $1/f_{IF}$. Because this process is only an approximation to a linear phase shift, harmonics are generated. For this configuration of three rf phase shifters, the most significant ones are at eight times the frequency, $f_{IF}$. However, by selecting the pulse repetition or gating frequency (PRF) to be smaller than the harmonic frequencies (8·$f_{IF}$), the Doppler returns associated with these harmonic frequencies will after demodulation always lie outside the receiver passband and have no adverse affect on system operation.

The output from the digital SSB is input to the rf power amplifier 33. A circulator 59 is used to direct the rf input into a phase-locked rf oscillator 60. This oscillator phase locks to the rf input and, therefore, the output is an amplified replica of the signal input. This output is then fed back into the circulator which directs the signal to the rf output port.

It should be noted that both SSB 32 and rf amplifier 33 are gated at the pulse repetition frequency (PRF). During the "ON" state, the process described above is performed, and the output from the rf amplifier is an amplified, frequency-translated version of the input to the SSB. During the "OFF" state, the SSB and rf amplifier are set into a high isolation state, and the rf phase shifting in the SSB is stopped. Hence any leakage of the rf input through these two components, will not be frequency translated and will demodulate to zero frequency. Since the Doppler receiver passband is at the intermediate frequency, fIF, this demodulated signal lies outside of the receiver passband.

From the foregoing, a Doppler radar providing means for eliminating transmitter reflected signals in the receiver has been described. It will be appreciated that although particular embodiments of the invention have been shown and described, modifications may be made. It is intended in the following claims to cover all modifications which come within the spirit and scope of the invention.

What is claimed is:

1. A Doppler radar comprising:
   a transmitter,
   a receiver,
   a common antenna connected to said transmitter and said receiver for transmission and reception of radar signals,
   a source of rf signals having a constant frequency,
   means in said receiver for obtaining an IF frequency by sampling a portion of said rf signals for use as a local oscillator and combining said local oscillator signals with return signals in a mixer,
   means in said transmitter for translating the frequency of said rf signals to a frequency representing the addition of said IF frequency with the frequency of said rf signals during transmit time and reverting back to the frequency of said rf signals during receive time, and
   means for simultaneously gating on said rf signals during transmit time and gating off said rf signals during receive time whereby leakage amplitude modulation signals are not demodulated into said receiver wherein said frequency translating means comprises a digital binary counter for translating said rf signals whereby leakage amplitude modulation sideband signals are not demodulated into the mixer of said receiver and said leakage signals lie outside the centered passband Doppler frequency.

2. The Doppler radar of claim 1 comprising:
   means for eliminating the amplitude modulation sideband signals from said frequency translating means during receiver on time whereby any residual leakage demodulates to a frequency outside of the Doppler passband.

3. The Doppler radar of claim 1 wherein said means for eliminating amplitude modulation sideband signals comprises:
   a pulse amplifier comprising a phase locked oscillator for phase locking the output of said modulator.

4. A solid state Doppler radar comprising:
   a transmitter,
   a receiver,
   a common antenna connected to said transmitter and said receiver for transmission and reception of radar signals indicative of velocity,
   a source of reference rf signals comprising coherent radar signals for simultaneous use in said receiver and transmitter,
   means for isolating said reference signals from said receiver and for attenuating a portion of said reference signals for coupling to said receiver,
   means responsive to said isolating and coupling means for translating the frequency of said reference signal only during transmit time,
   means connected to said translating frequency means for phase locking said translated frequency,
   means connected to said phase locking means for decoupling said receiver from said antenna during transmit time and for decoupling said transmitter from said antenna during receive time,
   means connected to said antenna decoupling means for amplifying said received signals,
   a mixer,
   a first rf switch for applying said attenuated reference rf signal to said mixer,
   a second rf switch for applying said received signals to said mixer said received signals being down converted in said mixer by demodulating with said reference signal,
   means connected to said first and second rf switches for gating said switches to attenuate the signal into said mixer thereby preventing any frequency translation of transmitted signal from leaking into said mixer, and
   means for amplifying the output of said mixer for application to velocity determination circuits.

* * * * *